United States Patent
Dubay et al.

(10) Patent No.: US 6,942,250 B2
(45) Date of Patent: Sep. 13, 2005

(54) ENERGY ABSORBER FOR MOTOR VEHICLE STEERING COLUMN

(75) Inventors: Kurt D. Dubay, Merrill, MI (US); Thomas Glowacki, Freeland, MI (US)

(73) Assignee: Delphi Technologies, Inc., Troy, MI (US)

( * ) Notice: Subject to any disclaimer, the term of this patent is extended or adjusted under 35 U.S.C. 154(b) by 168 days.

(21) Appl. No.: 10/428,560

(22) Filed: May 2, 2003

(65) Prior Publication Data

US 2004/0217581 A1 Nov. 4, 2004

(51) Int. Cl.[7] .................................................. B62D 1/19
(52) U.S. Cl. ...................................................... 280/777
(58) Field of Search ........................................ 280/777

(56) References Cited

U.S. PATENT DOCUMENTS

| | | | | |
|---|---|---|---|---|
| 4,989,898 A | * | 2/1991 | Yamaguchi et al. | ........ 280/777 |
| 5,209,135 A | * | 5/1993 | Ichikawa | .................... 280/777 |
| 5,669,634 A | | 9/1997 | Heinzman et al. | |
| 5,706,704 A | | 1/1998 | Riefe et al. | |
| 6,176,151 B1 | | 1/2001 | Cymbal | |
| 6,322,103 B1 | | 11/2001 | Li et al. | |
| 6,450,532 B1 | | 9/2002 | Ryne et al. | |
| 6,454,302 B1 | | 9/2002 | Li et al. | |
| 6,575,497 B1 | | 6/2003 | McCarthy et al. | |
| 6,659,504 B2 | * | 12/2003 | Riefe et al. | ................. 280/777 |
| 2004/0232685 A1 | * | 11/2004 | Gatti et al. | ................. 280/777 |
| 2004/0245760 A1 | * | 12/2004 | Kondoh et al. | ............. 280/777 |
| 2005/0012316 A1 | * | 1/2005 | Ben Rhouma et al. | ..... 280/777 |
| 2005/0052014 A1 | * | 3/2005 | Lee | ............................ 280/777 |

* cited by examiner

Primary Examiner—Paul N. Dickson
Assistant Examiner—Joselynn Y. Sliteris
(74) Attorney, Agent, or Firm—Michael D. Smith

(57) ABSTRACT

An energy absorber may be used with the motor vehicle steering column of a motor vehicle is provided. The steering column includes a tubular mast jacket and a steering shaft. The tubular mast jacket has an upper end and a lower end. The steering shaft is located and rotatable within the mast jacket. Thee mast jacket and steering shaft are centered along a longitudinal center line. The mast jacket further includes an outer jacket with a top line parallel to the center line and located at a top of the mast jacket. The energy absorber includes a sleeve and a lower mounting bracket. The sleeve has a first end and a second end and forms a sleeve bore for receiving the lower end of the mast jacket. The lower mounting bracket is mounted on a body structure of the motor vehicle and defines a lower mounted bracket bore for receiving the second end of the sleeve. The energy absorber further includes a convex anvil located on at the second end of the sleeve, and generally being centered along the top line. A generally J-shaped strap having first and second legs and a concave web therebetween is generally centered along the top line. The concave web bears against the convex anvil. The first leg is coupled to the lower mounting bracket.

5 Claims, 3 Drawing Sheets

US 6,942,250 B2

ENERGY ABSORBER FOR MOTOR VEHICLE STEERING COLUMN

FIELD OF THE INVENTION

The present invention relates to energy absorbing steering columns for use with motor vehicles.

BACKGROUND OF THE INVENTION

A previously known energy absorber of simple construction for a motor vehicle steering column consists of a convex anvil on the steering column near the upper end thereof and a stationary flat metal strap having a concave web seated against the convex anvil. During linear translation of the steering column under impact, the concave web of the metal strap moves wave-like along the length of the metal strap effecting concurrent plastic deformation of the latter to convert into work a fraction of the kinetic energy of the impact.

The placement of the energy absorber near the upper end of the steering column consumes space on the vehicle in an already congested environment. Further, it is desirable from a performance standpoint that parallelism exist between the metal strap and the direction of linear translation of the steering column both before and during linear translation of the steering column under impact.

It is also known to utilize two "J" straps fixed to a yoke mounted on the motor vehicle. The straps are fixed to the yoke and wrap around two anvils connected to the steering wheel. The straps are located at the "3" and "9" positions, directly across from one another.

Such systems are disclosed in U.S. Pat. Nos. 5,669,639 and 5,706,704. However, differences in the straps, e.g., due to manufacturing tolerances, may result in variances in the collapse load on the absorber. Furthermore, the multi-strap design with "J" types straps located at the "3" and "9" O'clock positions (as disclosed in the '704 and '639 Patents) introduces an undesirable moment on the steering column when an off-axis load is applied to the steering column with vertical type mounting features to the vehicle body structure.

The present invention is aimed at one or more of the problems as set forth above.

SUMMARY OF THE INVENTION AND ADVANTAGES

In one aspect of the present invention, an energy absorber for use with a motor vehicle steering column of a motor vehicle is provided. The steering column includes a tubular mast jacket and a steering shaft. The tubular mast jacket has an upper end and a lower end. The steering shaft is located and rotatable within the mast jacket. Thee mast jacket and steering shaft are centered along a longitudinal center line. The mast jacket further includes an outer jacket with a top line parallel to the center line and located at a top of the mast jacket. The energy absorber includes a sleeve and a lower mounting bracket. The sleeve has a first end and a second end and forms a sleeve bore for receiving the lower end of the mast jacket. The lower mounting bracket is mounted on a body structure of the motor vehicle and defines a lower mounted bracket bore for receiving the second end of the sleeve. The energy absorber further includes a convex anvil located on at the second end of the sleeve, and generally being centered along the top line. A generally J-shaped strap having first and second legs and a concave web therebetween is generally centered along the top line. The concave web bears against the convex anvil. The first leg is coupled to the lower mounting bracket.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
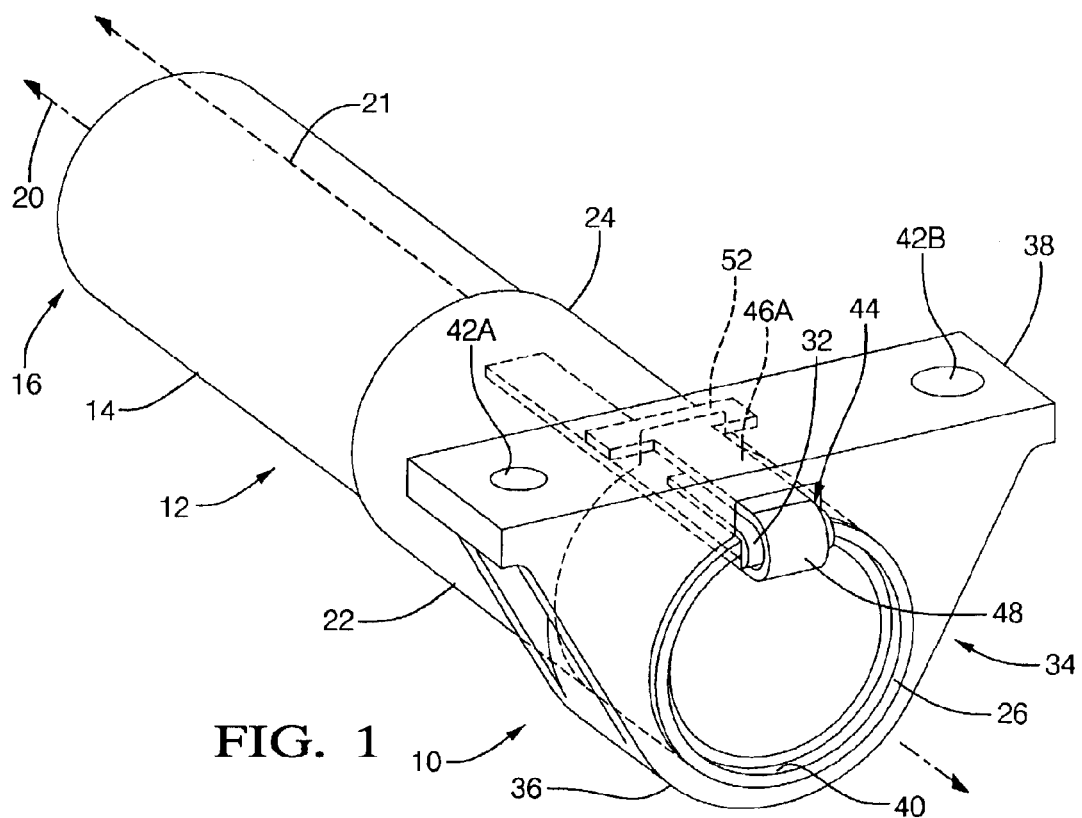
FIG. 1 is a first diagrammatical illustration of a steering column with an energy absorber, according to an embodiment of the present invention.
Figure 2:
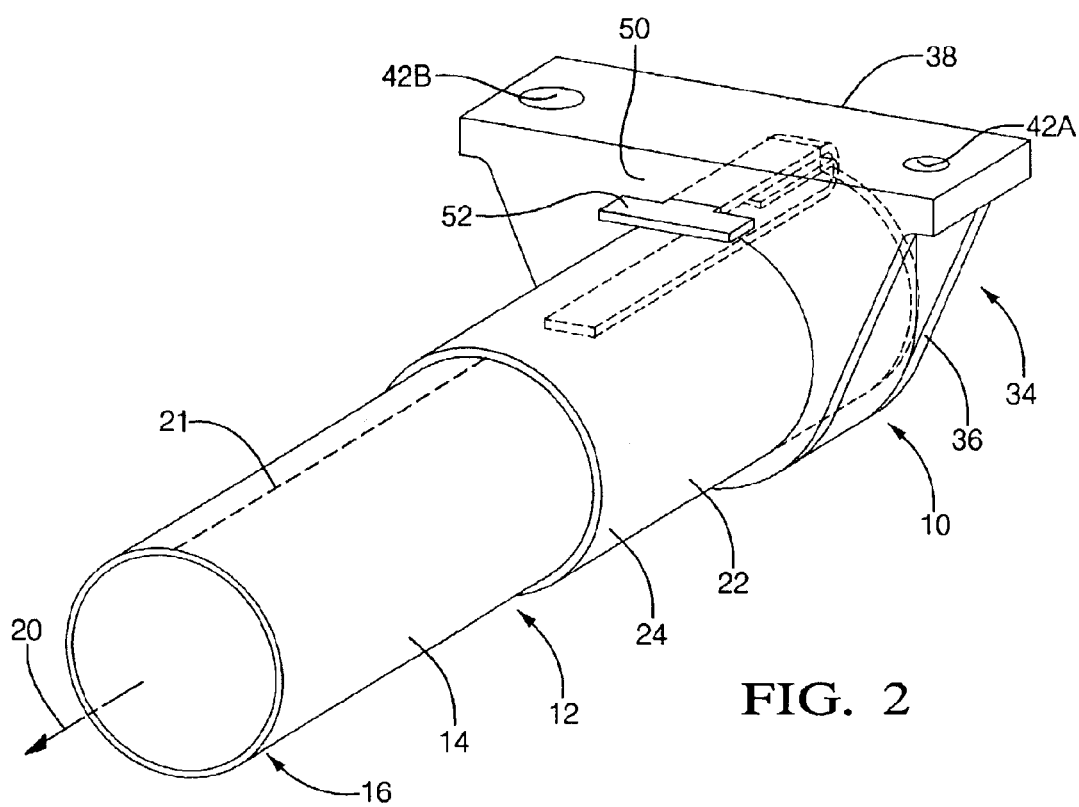
FIG. 2 is a second diagrammatical illustration of the steering column of FIG. 1.
Figure 3:
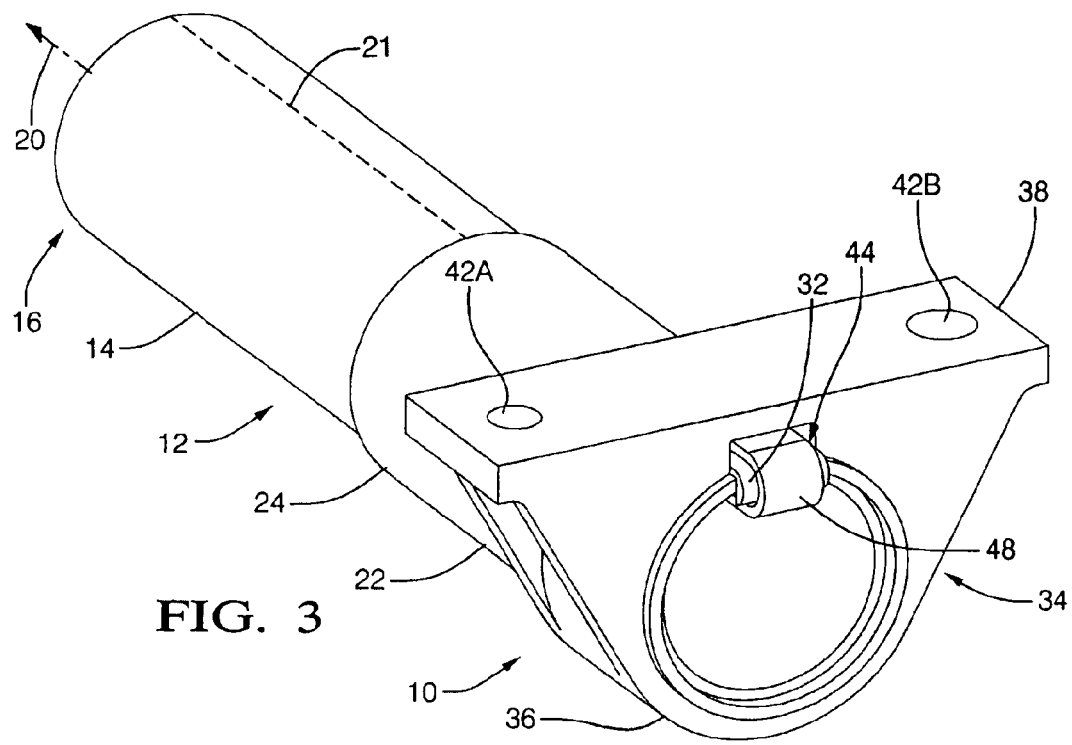
FIG. 3 is a third diagrammatical illustration of the steering column of FIG. 1.
Figure 4:
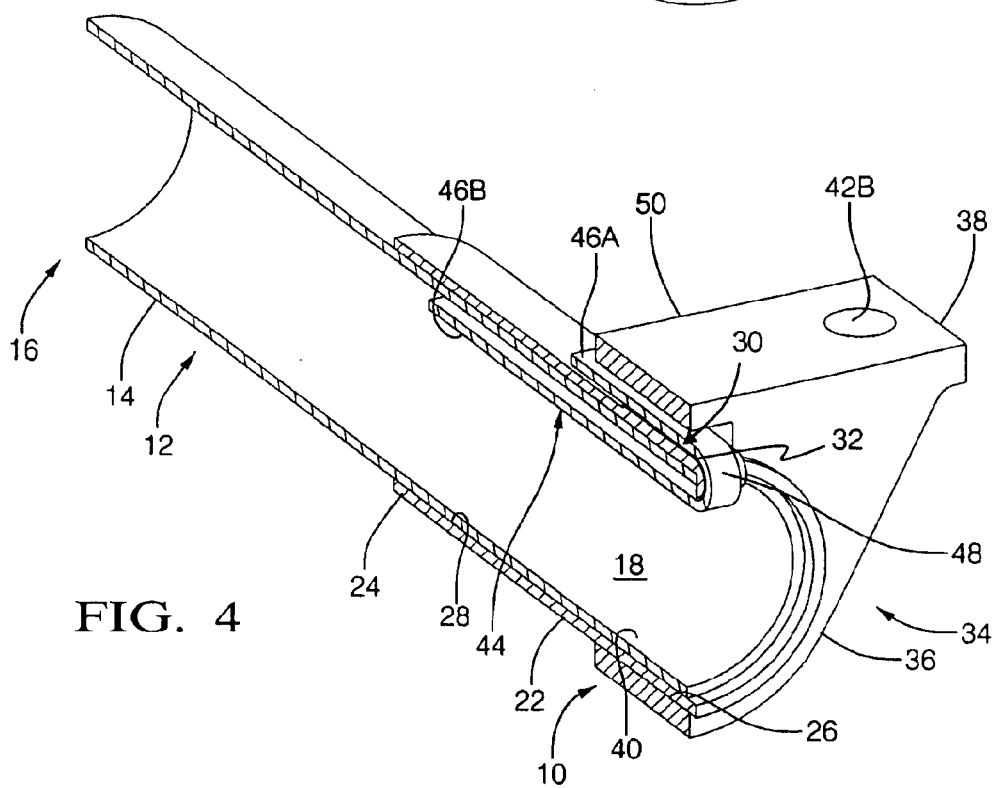
FIG. 4 is a first cut-away view of the steering column of FIG. 1.
Figure 5:
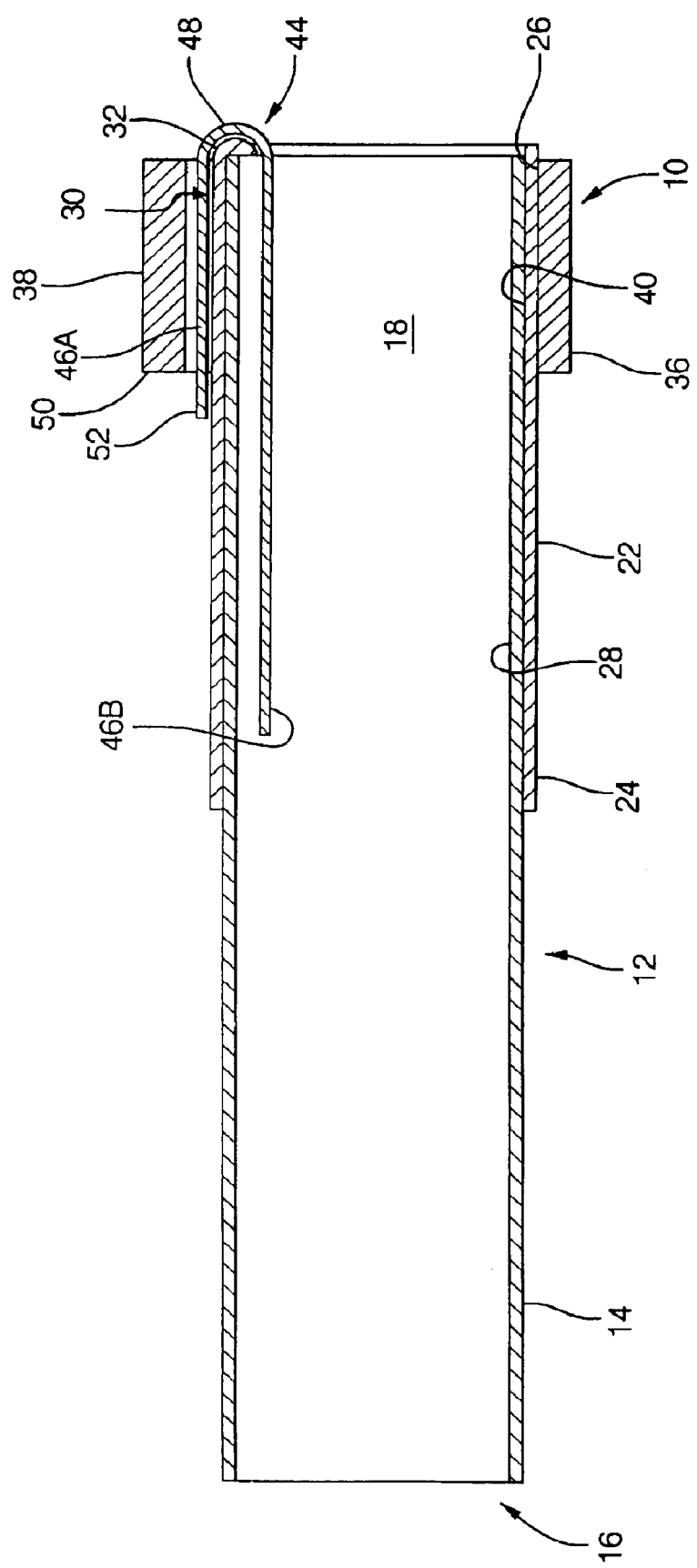
FIG. 5 is a second cut-away view of the steering column of FIG. 1.

With reference to the drawings and in operation, the present invention provides an energy absorber 10 for use with a steering column 12 of a motor vehicle (not shown). The motor vehicle steering column 12 includes a tubular mast jacket 14 having an upper end 16 and a lower end 18. In one aspect of the present invention, the steering column 12 provides a tilting function which allows the steering column 12 or the steering wheel (not shown) in a conventional manner. In one embodiment, the lower end 18 of the mast jacket 14 is pivotally mounted to a body structure (not shown) of the motor vehicle. Such steering columns are shown in U.S. Pat. Nos. 5,669,634 and 5,706,704 which are hereby incorporated by reference. In another embodiment, a tilt mechanism (not shown) is mounted to the upper end 16 of the mast jacket 14.

The steering column 12 includes a steering shaft (not shown) which is located and rotatable within the mast jacket 14 in a conventional manner. A longitudinal centerline 20 of the mast jacket 14 coincides with the longitudinal centerline of the steering column. The mast jacket 14 also has a top line 21 parallel to the center line 20 and located at the top of the mast jacket 14, as shown.

In one embodiment, the steering shaft has an upper end (not shown) projecting beyond the upper end 16 of the mast jacket 14 and a lower end (not shown), projecting beyond the lower end 18 of the mast jacket 14. A ball bearing (not shown) is interference fitted between the mast jacket 14 and the steering shaft, in supporting the steering shaft on the mast jacket 14 for rotation about the longitudinal centerline 20. Thrust bearings, not shown, transfer thrust in the direction of the longitudinal centerline 20 from the steering shaft to the mast jacket 14 so that forces attributable to an impact on a steering wheel, not shown, on the upper end of the steering shaft are transferred from the steering shaft to the mast jacket 14.

A sleeve 22 is rigidly fitted on the outside of the mast jacket 14 adjacent the lower end 18. The sleeve 22 includes a first end 24 and a second end 26 and forms a sleeve bore 28 for receiving the lower end 18 of the mast jacket 14.

A convex anvil 32 is located at the second end 26 of the sleeve 22 and is generally centered along the top line 21. In the illustrated embodiment, the sleeve 22 includes an outer edge 30 located at the lower end 18. The convex anvil 32 may be formed by the outer edge 30.

The energy absorber 10 also includes a lower mounting bracket 34. In the illustrated embodiment, the lower mounting bracket 34 includes base portion 36 and a mounting portion 38. The base portion 36 forms a base bore 40 for receiving the second end 26 of the sleeve 22. The mounting portion 38 used to mount the lower mounting bracket 34 to the body structure of the motor vehicle. In the illustrated embodiment, mounting portion 38 includes first and second bolt apertures 42A, 42B for receiving bolts (not shown) for mounting the lower mounting bracket 34 to the body structure.

The energy absorber 10 further includes a generally J-shaped strap 44 having first and second legs 46A, 46B and a concave web 48 therebetween. The strap 44 is generally centered along the top line 21 and the concave web 48 bears against the convex anvil 32.

In the illustrated embodiment, the first leg 46A is coupled to the lower mounting bracket 34 such that linear translation of the mast jacket 14 relative to the lower mounting bracket 34 in the direction of the centerline 20 of the mast jacket 14 in response to an impact on the steering column 12 being operative to effect relative sliding of the strap 44 across the convex anvil 32 to plastically deform the strap 44 and convert into work a fraction of the kinetic energy of the impact on the steering column 12.

In one embodiment of the present invention the first leg 46A is coupled to the lower mounting bracket 34 by a bolt or other fastener (not shown). In another embodiment of the present invention, the lower mounting bracket 34 includes a retaining surface 50 and the first leg 46A includes a retaining portion 52, shown as a "T". The retaining portion being positioned adjacent the retaining surface.

As is known in the art, a generic clamp (not shown) is disposed between the motor vehicle and the upper end 16 of the mast jacket 14. In one embodiment, the generic clamp is coupled to the mast jacket 14 via a capsule.

An energy-absorbing collapse stroke of the steering column 12 commences with an impact toward the body structure on the steering wheel on the upper end of the steering shaft. Force attributable to the impact is transferred from the steering shaft to the mast jacket 14 causing the capsules to break and release the mast jacket 14. With the first leg 46A of the strap 44 restrained by the lower mounting bracket 34, linear translation of the mast jacket 14 in the direction of its longitudinal centerline 20 relative to the lower mounting bracket 34 causes relative sliding of the strap 44 across the convex anvil 32 with plastic deformation of the strap 44 as the strap 44 is bent through about 180 degrees.

Obviously, many modifications and variations of the present invention are possible in light of the above teachings. The invention may be practiced otherwise than as specifically described within the scope of the appended claims.

What is claimed is:

1. An energy absorber for use with a motor vehicle steering column of a motor vehicle, the steering column having a tubular mast jacket, the tubular mast jacket having an upper end and a lower end, the mast jacket being centered along a longitudinal center line, the mast jacket further having a top line parallel to the center line and located at a top of the mast jacket, comprising:

a sleeve having a first end and a second end and forming a sleeve bore for receiving the lower end of the mast jacket;

a lower mounting bracket mounted on a body structure of the motor vehicle, the lower mounting bracket defining a lower mounted bracket bore for receiving the second end of the sleeve;

a convex anvil located at the second end of the sleeve, the convex anvil being generally centered along the top line;

a generally J-shaped strap having first and second legs and a concave web therebetween and being generally centered along the top line, the concave web bearing against the convex anvil, the first leg being coupled to the lower mounting bracket, linear translation of the mast jacket relative to the lower mounting bracket in the direction of the centerline of the mast jacket in response to an impact on the steering column being operative to effect relative sliding of the strap across the convex anvil to plastically deform the strap and convert into work a fraction of the kinetic energy of the impact on the steering column.

2. An energy absorber, as set forth in claim 1, the sleeve having an outer edge located at the second end, the outer edge forming the convex anvil.

3. An energy absorber, as set forth in claim 2, the concave web bearing against the convex anvil such that said first leg is outside of the mast jacket.

4. An energy absorber, as set forth in claim 3, wherein the second leg is inside of the mast jacket.

5. An energy absorber, as set forth in claim 1, wherein the lower mounting bracket includes a retaining surface, the first leg includes a retaining portion, the retaining portion being positioned adjacent the retaining surface.

* * * * *